G. E. BLAKE.
TIRE SHRINKER.
APPLICATION FILED MAR. 17, 1908.
960,798.
Patented June 7, 1910.
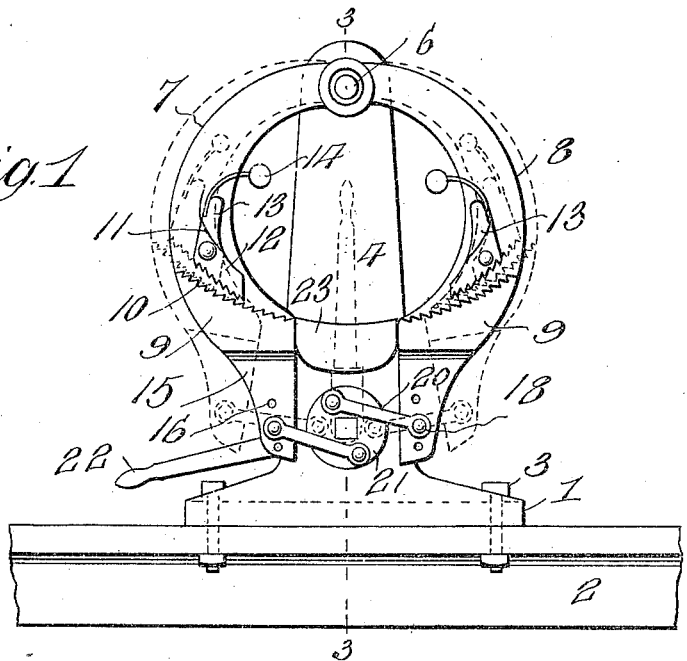
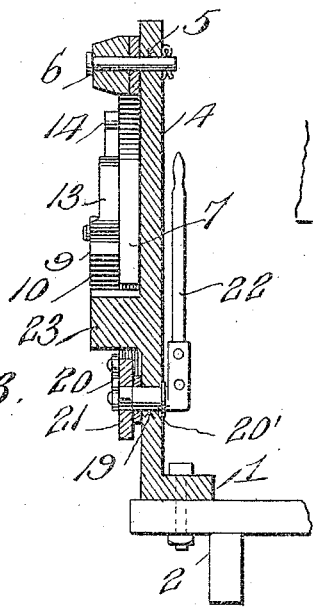
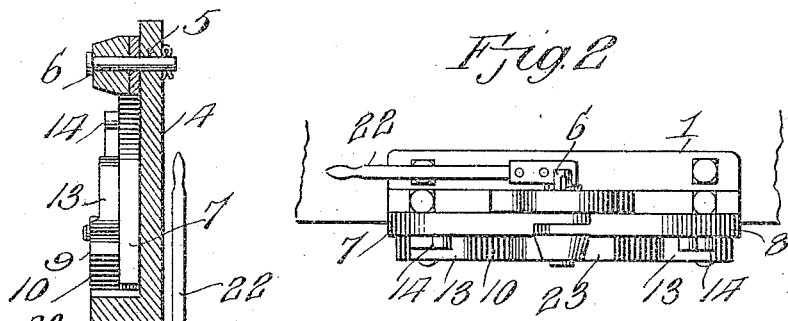
Witnesses
Frank Hugh
Inventor
George E. Blake,
By Victor J. Evans
Attorney

UNITED STATES PATENT OFFICE.

GEORGE E. BLAKE, OF QUINCY, INDIANA.

TIRE-SHRINKER.

960,798.  Specification of Letters Patent.  Patented June 7, 1910.

Application filed March 17, 1908. Serial No. 421,627.

*To all whom it may concern:*

Be it known that I, GEORGE E. BLAKE, a citizen of the United States, residing at Quincy, in the county of Owen and State of Indiana, have invented new and useful Improvements in Tire-Shrinkers, of which the following is a specification.

This invention relates to a device for shrinking the tires of vehicles, and the object of the invention is to provide a device of this character which will automatically grip the tire and hold it securely in engagement while a lever operating a pair of arms is moved to bring the arms toward each other, thus compressing the tire between the arms and effectively shrinking the tire.

Another object of the invention is to provide a device for shrinking tires, having a pair of pivoted arms provided with offsets having teeth and weighted dogs pivotally secured above the offsets and provided with teeth adapted to secure the tire, the arms being provided with an operating lever whereby they are swung toward each other and the standard supporting the arms and lever being provided with an offset forming a substantial anvil, upon which the compressed portion of the shrunk tire may be flattened.

To these ends the invention resides in the novel construction of elements and their arrangement in operative combination hereinafter fully described and claimed.

In the accompanying drawings, Figure 1 is a side elevation of a tire shrinking device constructed in accordance with my invention. Fig. 2 is a top plan view of the same. Fig. 3 is a central transverse sectional view upon the line 3—3 of Fig. 1.

My improved tire shrinking device may be positioned upon any desired suitable support, and in the accompanying drawings I have shown the face 1 of my device positioned upon a bench 2, and retained thereon by suitable bolts 3. The base 1 is provided with a vertical extension 4, providing a suitable standard, having its upper extremity provided with a perforation 5, adapted for the reception of a cotter pin 6, by which the arms of the shrinker are secured upon the standard. The arms 7 and 8 are each of an arcuate formation and are each provided with a circular offset portion 9, upon their faces. These offsets 9 are provided upon their upper circular faces with teeth 10, and pivotally secured to the arms 7 and 8 directly above the offsets are the clamping dogs 11. These clamping dogs 11 have their lower faces provided with teeth adapted to coact with the teeth 10 of the offsets 9 to retain a tire between the dogs and the offsets. The dogs 11 have a toe portion 12, projecting forward of their pivots and are provided with an upstanding portion 13 having a weighted extension 14, adapted to overlie the toe portion 12 of the dog and to normally force the teeth of the dog downwardly into engagement with the teeth of the offsets 9. The arms 7 and 8 are provided with an extension 15 below the offset 9, and each of these extensions is provided with a series of perforations 16 adapted for the reception of a pin 18, by which links 20 are pivotally secured to the arms. The standard 4 is provided with a suitable perforation 19, located in the center thereof and directly between the extensions 15 of the arms 7 and 8. Positioned within this opening 19 is a shaft 20', having a disk 21 provided upon its face with perforations by which the free ends of the links 20 may be attached. Upon the inner face of the standard 4, the shaft 20' is provided with a suitable handle or lever 22, by which the shaft is adapted to be rotated. Positioned upon the standard 4, directly between the inner faces of the offsets 9 of the arms 7 and 8 is an offset 23, which is adapted to serve as an anvil whereby the compressed portion of the tire may be flattened, or whereby the ends of the tire may be welded together, when it is found necessary to cut the tire for shrinking.

The operation of my device is as follows: The tire is heated at the point where it is to be shrunk, and if necessary cut. The points between the heated portion of the tire are inserted between the teeth of the dogs 11 and the teeth of the offsets 9, it being understood that the jaws are spread away from each other when the tire is thus positioned. When the tire is secured, the handle or lever 22 is rotated, causing the disk 21 to revolve and carrying with it the links 20 secured to the arms 7 and 8, swinging the arms together and effectively shrinking the tire. It will be noted that by providing the extensions 15 of the arms 7 and 8 with the perforations 16, the links 20 may be readily adjusted through the medium of the pins 18 and the amount of throw given to the arms, when the lever 22 is moved, may be readily regulated.

From the above description it will be noted that I have provided a simple, cheap and effective device for shrinking tires of vehicles, one wherein the vehicle tire is automatically retained upon the arms, and the arms effectively swung together with a slight amount of physical exertion. It will be also noted that I have provided a tire shrinker with an effective anvil whereby the compressed portion of the tire may be flattened while the tire is being shrunk, and whereby the ends of the tire may be effectively welded together when it becomes necessary to cut the tire.

Having thus fully described the invention what is claimed as new is:

In a tire shrinking machine, a standard provided with vertically straight faces and having its rear face provided with an offset at its lower end and its front face provided with an integrally formed outwardly projecting member forming an anvil, a pair of oppositely disposed curved arms pivotally connected to the top of the standard, said arms each having their lower portions substantially straightened and their outer faces provided with arcuate integrally formed serrated faced offsets, dogs pivotally connected with the arms directly above the offsets thereof, each of said dogs having a serrated face and an upwardly extending arcuate extension provided with a weight, the straightened portions of the arms being provided with spaced openings, the standard below the anvil being provided with an opening, a shaft extending through this opening, a handle connected with the shaft and positioned adjacent the rear face of the standard, the forwardly projecting portion of the shaft being provided with a disk, link members pivotally connected with the disk at diametrically opposite points, said link members having their free ends provided with removable members whereby they may be positioned in any of the openings provided in the straightened portions of the arms.

In testimony whereof I affix my signature in presence of two witnesses.

GEORGE E. BLAKE.

Witnesses:
  HENRY J. EDWARDS,
  H. C. STOCKWELL.